United States Patent [19]

Zurmühlen

[11] Patent Number: 5,692,684

[45] Date of Patent: Dec. 2, 1997

[54] INJECTION COOLER

[75] Inventor: Günter Zurmühlen, Schloss Holte-Stukenbrock, Germany

[73] Assignee: Holter Regelarmaturen GmbH & Co. KG, Schloss Holte-Stukenbrock, Germany

[21] Appl. No.: 495,613

[22] PCT Filed: Jan. 18, 1994

[86] PCT No.: PCT/EP94/00113

§ 371 Date: Sep. 12, 1995

§ 102(e) Date: Sep. 12, 1995

[87] PCT Pub. No.: WO94/18499

PCT Pub. Date: Aug. 18, 1994

[30] Foreign Application Priority Data

Feb. 3, 1993 [DE] Germany ............ 43 02 974.4

[51] Int. Cl.$^6$ .................................................. A62C 37/20
[52] U.S. Cl. .................. 239/563; 239/584; 251/122; 261/71; 261/DIG. 13; 261/DIG. 38
[58] Field of Search ............... 239/583, 584, 239/443, 128, 132, 563, 553.5; 261/71, DIG. 13, DIG. 38; 137/339; 251/122

[56] References Cited

U.S. PATENT DOCUMENTS

| 2,483,719 | 10/1949 | Anderson | 239/563 |
|---|---|---|---|
| 2,515,301 | 7/1950 | Hughey | 239/563 |
| 3,331,590 | 7/1967 | Battenfeld et al. | 261/DIG. 13 |
| 3,732,851 | 5/1973 | Self | 261/DIG. 13 |
| 4,071,586 | 1/1978 | Seger | 261/DIG. 13 |
| 4,130,611 | 12/1978 | Brand | 261/DIG. 13 |
| 4,442,047 | 4/1984 | Johnson | 261/DIG. 13 |
| 4,522,582 | 6/1985 | Curtis | 251/122 |
| 4,828,767 | 5/1989 | Smirnoff | 261/71 |
| 5,380,470 | 1/1995 | Jacobsson | 261/DIG. 13 |
| 5,439,619 | 8/1995 | Küffer | 261/DIG. 13 |

FOREIGN PATENT DOCUMENTS

| 10 20 642 | 12/1957 | Germany. |
| 37 13 726 A1 | 11/1988 | Germany. |
| 289 690 | 7/1965 | Netherlands. |
| 1 592 153 | 7/1981 | United Kingdom. |

*Primary Examiner*—Andres Kashnikow
*Assistant Examiner*—Lisa Ann Douglas
*Attorney, Agent, or Firm*—Browdy and Neimark

[57] ABSTRACT

The invention is directed to a spray cooler for regulating the temperature of superheated steam with a stream of cooling water. Its primary inventive feature is directed to a throttle area which has a continuously widening cross section disposed on a piston rod and arranged between the cooling water inlet opening and the nozzles of the spray cooler. The throttle area serves to regulate the pressure the cooling water in proportion to the movement of the piston carrying the throttle.

19 Claims, 2 Drawing Sheets

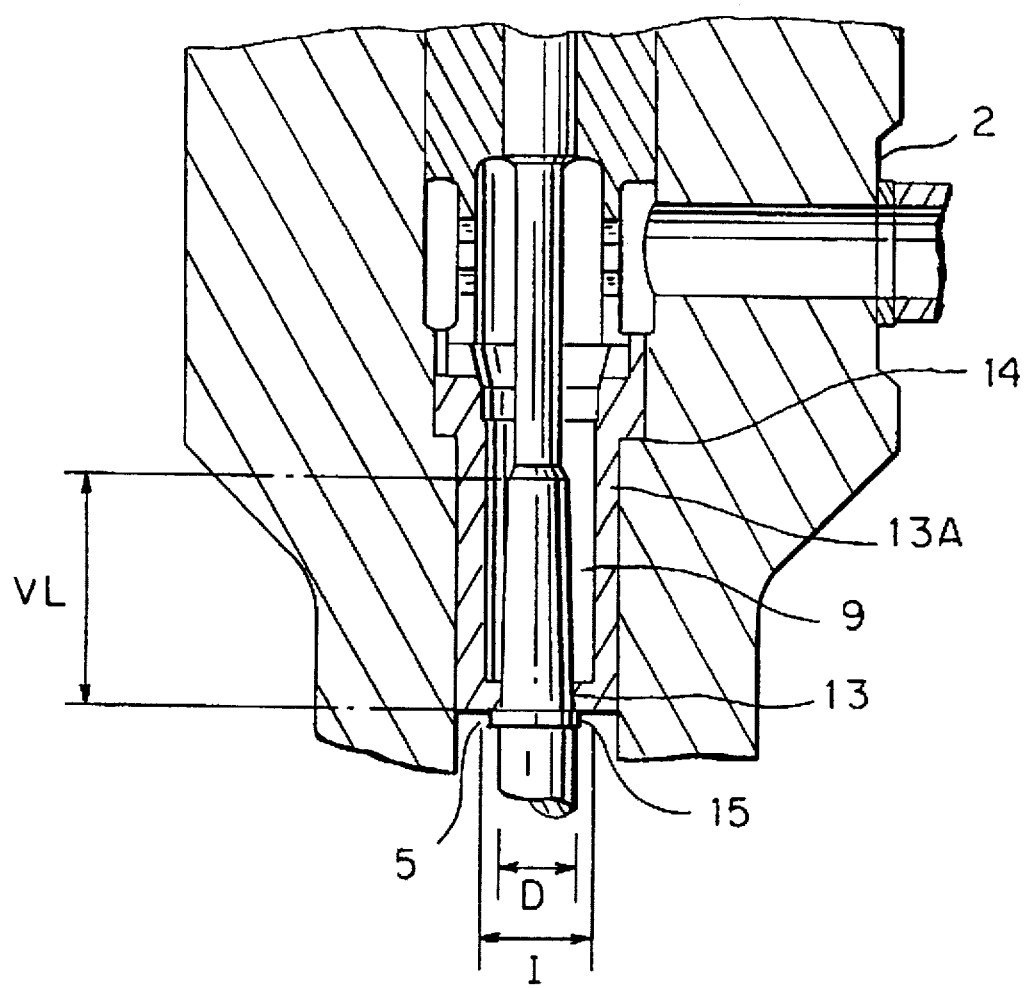

INJECTION COOLER

BACKGROUND OF THE INVENTION

1. Technical Field of the Invention

The invention relates to a spray cooler for regulating the temperature of superheated steam. The spary cooler has a housing consisting of a housing head with a water inlet opening and a nozzle insertion pipe, and a nozzle head disposed at the end of the nozzle insertion pipe into the walls of which nozzles have been placed axially one behind the other. An axially movable piston rod with a regulating piston on the nozzle end which controls the nozzles as a function of its position for unblocking or blocking the flow-through of cooling water is disposed inside the housing in a hollow-cylindrical cooling water line arranged between the water inlet opening and the nozzles. In in a closed position the regulating piston completely seals the nozzle head at the inlet side and in an open position unblocks all nozzles.

2. Prior Art

Spray coolers of the above mentioned type are known and are often used for temperature regulation of superheated steam, for example in power plants.

A spray cooler of the above described type is described in a pamphlet of the Narvik Armaturenvertriebsgesellschaft mbH [Narvik Fitting Sales Company], Erich Müllerstr. 22–24, 4000 Düsseldorf 13, Pamphlet No.: VN-A.T.-Temp-9002/08. The known spray cooler cools superheated steam contained in a boiler or flowing in a steam line by injecting water which has been atomized by the nozzles. The continuous amount of the cooling medium injected into the boiler or the steam line can be preset by a stroke setting of the regulating piston, wherein one or several of the nozzles are unblocked or blocked and the steam temperature of the released steam can be controlled in this way.

The stroke position of the regulating piston can be adjusted manually or can be controlled or regulated hydraulically or by an electric motor, in which case a temperature sensor introduced into the steam line transmits appropriate signals to a microprocessor controlling the stroke movements.

The known spray coolers have the disadvantage that often the nozzles are exposed to a very high feed pressure of the cooling water provided and are relatively rapidly worn or destroyed by this.

Pressure water lines under an operating pressure of more than 100 bar are often provided at the place where they are used. The known spray coolers are used with a water pressure of sometimes more than 100 bar and the counter-pressure of the steam to be cooled often is considerably less, so that almost the entire force of the water pressure is applied to the respectively open nozzles. The nozzles are being destroyed relatively rapidly by erosion as a result of the flow speed. This causes, in addition to increased repair and replacement part costs, short maintenance intervals which increase the costs.

OBJECT AND SUMMARY OF THE INVENTION

It is the object of the invention to improve the spray cooler mentioned at the outset in such a way that an approximately even water pressure is provided independently of the respective amount of cooling water supplied which, on the one hand, assures sufficient atomization and, on the other, does not destroy the nozzles.

The object is attained in accordance with the invention in that at least one coaxial throttle area with an axially continuously widening throttle cross section is disposed on the piston rod between the water inlet opening and the nozzles, which is closed in the blocking position of the piston rod and which releases a largest possible ring-shaped throttle cross section in the open position.

The spray cooler in accordance with the invention advantageously utilizes the stroke travel of the regulating piston preset by the control of the nozzle sealing by means of the control pistons for achieving a pre-sealing of the cooling water line and a pressure pre-reduction at the respectively unblocked nozzles.

In the closed position of the regulating piston, the pre-sealing throttle body, which usually is a throttle cone, blocks the cooling water line in addition to the control pistons which block the water exit openings of the nozzles.

In accordance with the position of the regulating piston, which defines the nozzle opening, as a result of the stroke movement of the regulating piston, the pre-sealing piston unblocks the cooling water line in that upstream of the nozzles one cooling water admitting surface respectively matched to the opened nozzle surface is unblocked. The cone-shaped design of the pre-sealing piston results in an increase of the cooling water admitting surface proportional to the stroke movement.

The cooling water admitting surface defined by the position of the pre-sealing cone reduces the pressure of the cooling water present at the water inlet opening to a degree which is designed for the nozzles and in this way reduces the wear on the nozzles caused by erosion.

Thus the cooling water pressure is reduced in two stages in the novel spray cooler. The first partial pressure reduction in this two-stage spray cooler takes place at the pre-sealing piston and the second partial pressure reduction in the nozzles.

The pre-sealing cone is advantageously disposed in the housing head. When using nozzle insertion pipes of different lengths, respectively the same housing head with the guidance receptacle in combination with the respective nozzle insertion pipe can therefore be used, because of which the storage and production costs are kept low.

A guidance receptacle which acts as a cone seat, in which the pre-sealing cone disposed on the piston rod is inserted, is advantageously screwed into the cooling water line. This design permits the employment of particularly erosion-resistant materials for the guidance receptacle. Because of this the housing head can be made of a different, less expensive material.

The pressed-in guidance receptacle is preferably sealed steam-tight against the housing head.

Advantageously the length of the pre-sealing cone corresponds to at least the stroke travel of the regulating piston. The guidance of the pre-sealing piston in the outlet of the guidance receptacle on the nozzle side is assured by means of this. Because of its conical design, the pre-sealing piston is centered when the outlet on the nozzle side is closed, which assures the exact closing of the cooling water line in the closing stroke position.

The pre-sealing cone preferably has an expanded sealing collar on the outside of the guidance receptacle which, in the closing stroke position, additionally completely seals the guidance receptacle and thus the cooling water line on the outside of the outlet opening. For one, this expanded sealing collar assures a steam-tight blocking of the cooling water line in the closing stroke position and also is used as a stop for the closing stroke position.

The pre-sealing throttle body is advantageously designed to be conical or paraboloidal. The curvature of the conical shape of the pre-sealing body which is determined by a parabola results in a more accurate adaptation of the cooling water admitting surface to the water outlet opening surface, while taking into consideration the flow and pressure conditions.

In a further embodiment of the spray cooler, a three-stage spray cooler, it has been provided to arrange two pre-sealing cones axially one behind the other on the regulating piston. The two pre-sealing cones are assigned to respectively one guidance receptacle in the cooling water line, and in the closing stroke position block the respective guidance receptacle and therefore the cooling water line in a steam-tight manner. With the opening stroke movement of the piston rod respectively the guidance receptacle and thus the cooling water line to the nozzle head chamber is opened, matched to the unblocking of the water outlet openings by the control piston.

This design of the spray cooler reduces the cooling water pressure at the water inlet opening in two additional stages, so that the reduced remaining pressure is present at the nozzles. The cooling water pressure is reduced in a first stage at the first pre-sealing cone and reduced in a second stage at the second pre-sealing cone, because of which it is also possible to use a particularly high cooling water pressure present at the water inlet opening for cooling the steam without resulting in damage to the nozzles which represent the third pressure reduction stage.

The two cone seats disposed one behind the other are embodied in a guidance receptacle made of a flow-resistant material screwed into the cooling water line.

The guidance receptacle with two cone seats is sealed steam-tight against the housing head by means of a sealing ring.

The lower pre-sealing cone advantageously has an expanded sealing collar on the outside of the guidance receptacle which, in the closing stroke position, additionally seals the guidance receptacle and thus the cooling water line at the outlet side and is used as closing stroke position stop.

The spray cooler in accordance with the invention can be used without damage of the nozzles even at high cooling water pressures, since the pre-sealing cone(s) reduce the water pressure to a sufficient degree prior to reaching the nozzles.

When using the two-stage spray cooler, i.e. the one with only one pre-sealing cone, a cooling water pressure of, for example, 85 bar is reduced by 30 bar by means of the pre-sealing cone in accordance with the invention. After subtracting the steam pressure in the steam line of 10 bar, for example, which acts counter to the cooling water pressure, a remaining pressure of 45 bar is present at the nozzles which, on the one hand, does not damage the nozzles and, on the other, is still sufficiently high to cause atomization of the water in the nozzles sufficient for steam cooling.

When using a three-stage spray cooler, i.e. one with two pre-sealing cones disposed axially on top of each other, a cooling water pressure of, for example, 115 bar is reduced by the first pre-sealing cone by 30 bar and by the further pre-sealing cone also by 30 bar. After subtracting the steam pressure in the steam line of 10 bar, for example, which acts counter to the cooling water pressure, a remaining pressure of 45 bar is present at the nozzles which, on the one hand, does not damage the nozzles and, on the other, is still sufficiently high to cause atomization of the water in the nozzles sufficient for steam cooling.

BRIEF DESCRIPTION OF THE DRAWINGS

The invention will be extensively explained below in connection with FIG. 1 to FIG. 3 of the drawings.

FIG. 2 represents an axial section of the guidance receptacle with a pre-sealing cone;

FIG. 1 represents an axial section of the two-stage spray cooler (1).

DETAILED DESCRIPTION OF THE PREFERRED EMBODIMENT(S) OF THE INVENTION

Figure 1:
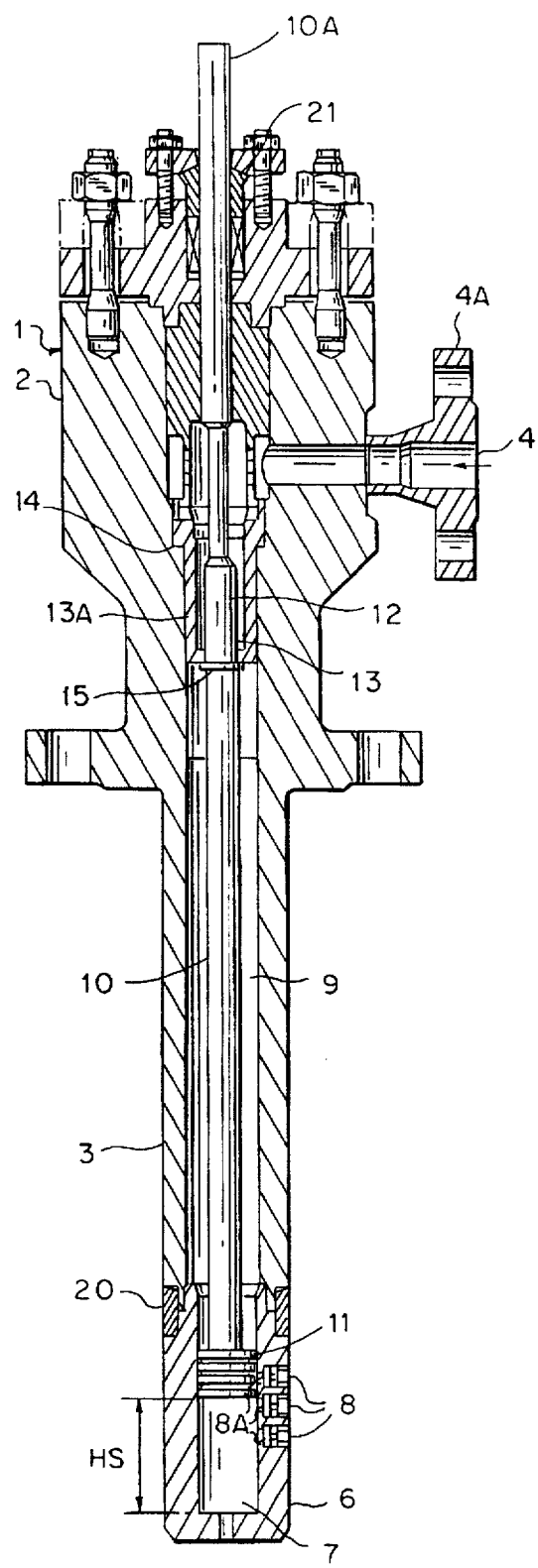
FIG. 1 represents an axial section of the two-stage spray cooler.

The spray cooler (1) has a housing (2, 3) comprising a housing head (2) with a water inlet opening (4) and a nozzle insertion pipe (3). For easy assembly, the water inlet opening (4) is provided with a welding neck flange (4A).

A nozzle head (6) with a nozzle head chamber (7), into which nozzles (8) containing the water outlet openings (8A) have been inserted axially one behind the other in the wall of the pipe, is screwed by means of a ring nut (20) to the end of the nozzle insertion pipe (3).

An axially movable piston rod (10) with a control piston (11) at the nozzle end, which seals the nozzle head chamber (7) steam-tight and controls the flow-through of the cooling water, is disposed in the housing (2, 3) of the spray cooler (1) in the hollow-cylindrical cooling water line (9) extending between the water inlet opening (4) and the nozzles (8).

The section (10A) of the piston rod (10), at the top in the drawing figure, extends through a stuffing box packing (21) out of the housing head (2) and can be actuated on the outside of the housing, for example by an electric motor, by means of which the stroke movements of the regulating piston (11) are controllable within the stroke travel (HS).

In a closed position of the regulating piston (11), the piston rings completely block the nozzle head chamber (7) on the inlet side. In the course of a stroke movement of the regulating piston (11), and thus of the control pistons, in the direction toward the outlet, the nozzles (8) disposed one behind the other or the water outlet openings (8A) are unblocked to a degree corresponding to the stroke movement or closed in the other direction.

A pre-sealing cone (12), conically shaped opposite to the water flow direction indicated by a flow arrow, is disposed on the piston rod (10) in the housing head (2) between the water inlet opening (4) and the nozzles (8).

The pre-sealing cone (12) has been seated in a guidance receptacle (13A) with a cone seat (13), which is pressed into the cooling water line (9) and sealed steam-tight against the housing head (2) by means of a sealing ring (14).

In the closing stroke position the pre-sealing cone (12) tightly closes the cooling water line (9) and in this way supports the sealing of the nozzles (8) by the control piston (11) with the piston rings.

In the course of a stroke movement of the piston rod (10) directed toward the outside, the pre-sealing cone (12) opens the cooling water line (9) to the nozzle head chamber (7) in a manner matched to the unblocking of the water outlet opening (8) by the piston (11), by means of which a first pressure reduction stage is created ahead of the nozzles (8), which assures an almost constant water pressure at the nozzles (8) independently of the degree of unblocking of the nozzles.

The spray cooler has two pressure reduction stages by means of this design, namely the nozzles (8) at the lower end and the pre-sealing cone (12) disposed in the housing head (2).

On the outside of the guidance receptacle the pre-sealing cone (12) has an expanded sealing collar (15), which additionally seals the guidance receptacle (13A) and therefore the cooling water line (9) on the outside in the closed position and beyond that acts as a closing position stop.

FIG. 2 represents an axial section of the guidance receptacle (13A) with a pre-sealing cone (12).

The pre-sealing cone (12) is arranged conically formed on the piston rod (10).

The pre-sealing cone (12) has been seated in a guidance receptacle (13A) with a cone seat (13), which is screwed into the cooling water line (9) and sealed steam-tight against the housing head (2) by means of a sealing ring (14). The guidance receptacle (13A) is essentially hollow-cylindrical and has an interior diameter (I), wherein the cone seat (13) has an outlet (5) with a tapered diameter (D) on the nozzle side.

In the closed position represented, the pre-sealing cone (12) tightly closes the cooling water line (9).

On the outside of the guidance receptacle the pre-sealing cone (12) has an expanded sealing collar (15), which additionally seals the guidance receptacle (13A) and therefore the cooling water line (9) on the outside in the closed position, and beyond that acts as a closing position stop.

A pre-sealing cone length (VL) approximately corresponds to the stroke travel (HS) of the regulating piston (11) represented in FIG. 1.

The pre-sealing cone (12) is conical or paraboloidal.

Figure 3:
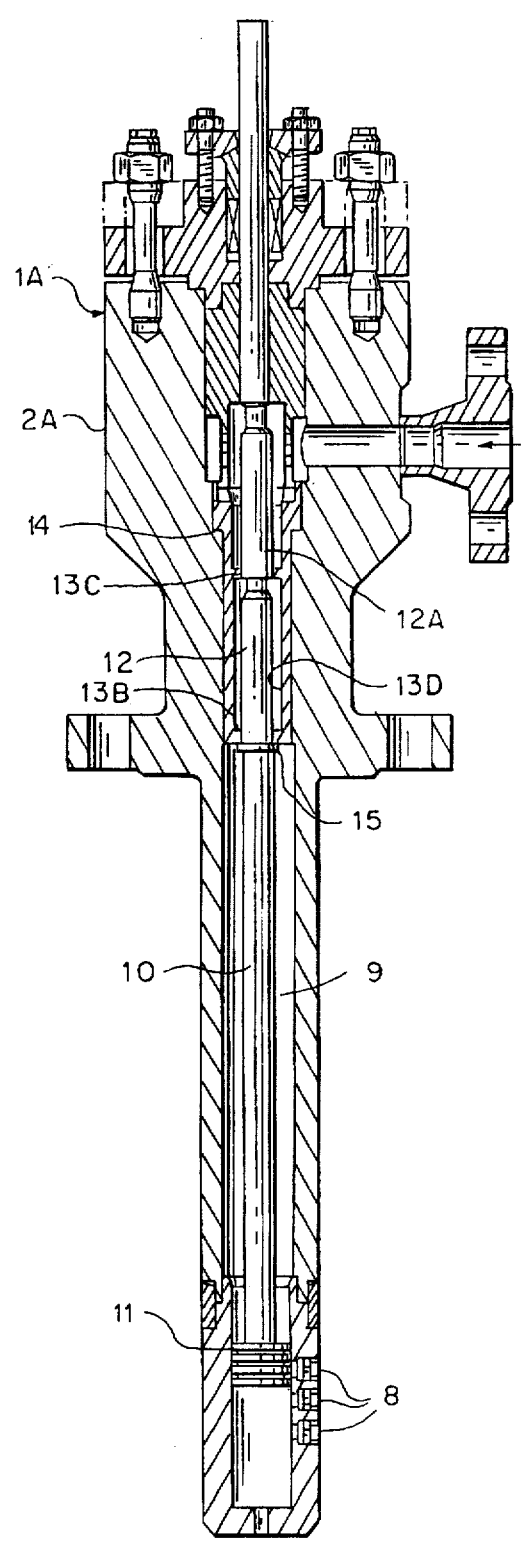
FIG. 3 represents an axial section of the three-stage spray cooler.

FIG. 3 represents an axial section of the three-stage spray cooler (1A).

In contrast to the two-stage spray cooler, the spray cooler (1A) has two pre-sealing cones (12, 12A) axially disposed one behind the other.

The pre-sealing cones (12, 12A) are arranged on the piston rod (10) respectively assigned to a cone seat (13B, 13C) in the cooling water line (9).

In the closed position the pre-sealing cones (12, 12A) tightly close the respective cone seat (13B, 13C) and thus the cooling water line (9).

In the course of an opening movement of the piston rod (10), the respective cone seats (13B, 13C) and thus the cooling water line (9) to the nozzle head chamber (7) are opened, matched to the unblocking of the water outlet opening (8A), by the control piston (11).

The cone seats (13B, 13C) are disposed in a guidance receptacle (13D), which is screwed into the cooling water line (9), disposed in the housing head (2A).

The guidance receptacle (13D) is sealed steam-tight against the housing head (2A) by means of a sealing ring (14).

On the outside of the guidance receptacle the lower pre-sealing cone (12) has an expanded sealing collar (15), which additionally seals the guidance receptacle (13D) and therefore the cooling water line (9) on the outside in the closing stroke position and additionally acts as a closing position stop.

It is within the scope of expertise to dispose the cone area of the throttle on the casing side and the cylindrical area on the piston rod side, wherein an appropriate shoulder or ring is disposed on the piston rod which unblocks the respectively associated throttle cross section toward the cone casing as a function of the stroke position.

The cone seat (13) and guidance receptacle (13D) can also be pressed into the cooling water line (9).

I claim:

1. A spray cooler for regulating the temperature of superheated steam, with a housing (2, 3) consisting of a housing head (2) with a water inlet opening (4) and a nozzle insertion pipe (3), a nozzle head (6) disposed at an end of the nozzle insertion pipe (3), and nozzles (8) placed axially one behind the other in a wall of said nozzle head, wherein an axially movable piston rod (10) with a regulating piston (11) slidable in the nozzle head, controls opening and closing and a flow of cooling water through the nozzles (8) as a function of the piston rod position inside the housing in a hollow-cylindrical cooling water line (9) which is arranged between the water inlet opening (4) and the nozzles (8), wherein in a closed position the regulating piston (11) completely seals the nozzle head (7) at an inlet side of the nozzles from a flow of cooling water and in an open position at a closed end of the nozzle head opens all the nozzles (8) to a flow of cooling water, wherein a first coaxial throttle area with an axially continuously widening throttle cross section is disposed on the piston rod (10) between the water inlet opening (4) and the nozzles (8), which is closed against a first cone seat when the regulating piston is in the closed position and which releases a largest possible ring-shaped throttle cross section of the first coaxial throttle area from the first cone seat when the regulating piston is in the open position.

2. A spray cooler in accordance with claim 1, wherein a first pre-sealing throttle body (12, 12A), which is formed so that it widens downstream, is disposed as the first coaxial throttle area in the first cone seat (13) disposed in the cooling water line (9).

3. A spray cooler (1) in accordance with claim 2, wherein the first pre-sealing throttle body (12) is disposed in the housing head (2).

4. A spray cooler (1) in accordance with claim 3, wherein the first pre-sealing throttle body (12) has been inserted into a guidance receptacle (13A), which has been screwed into the cooling water line (9).

5. A spray cooler (1) in accordance with claim 4, wherein the guidance receptacle (13A) is sealed by means of a sealing ring (14) against the housing head (2).

6. A spray cooler (1) in accordance with claim 5, wherein a length (VL) of a pre-sealing throttle body corresponds at least to the stroke travel (VS) of the regulating piston (11) between the closed position and the open position.

7. A spray cooler (1) in accordance with claim 6, wherein the first pre-sealing throttle body (12) has an expanded sealing collar (15) on the outside of the guidance receptacle which, in the closing stroke position, additionally seals the guidance receptacle (13A) and thus the cooling water line (9) on the outlet side.

8. A spray cooler (1) in accordance with claim 7, wherein the first pre-sealing throttle body (12, 12A) is designed to be conical or paraboloidal.

9. A spray cooler (1) in accordance with claim 2, wherein the first pre-sealing throttle body (12) has been inserted into a guidance receptacle (13A), which has been screwed into the cooling water line (9).

10. A spray cooler (1) in accordance with claim 9, wherein the guidance receptacle (13A) is sealed by means of a sealing ring (14) against the housing head (2).

11. A spray cooler (1) in accordance with claim 2, wherein a length (VL) of the first pre-sealing throttle body corresponds at least to the stroke travel (VS) of the regulating piston (11) between the closed position and the open position.

12. A spray cooler (1) in accordance with claim 2, wherein the first pre-sealing throttle body (12) has an expanded sealing collar (15) on the outside of the guidance receptacle which, in the closed position, additionally seals the guidance receptacle (13A) and thus the cooling water line (9) on the outlet side.

13. A spray cooler (1) in accordance with claim 2, wherein the first pre-sealing throttle body (12, 12A) is designed to he conical or paraboloidal.

14. A spray cooler (1A) in accordance with claim 2, wherein a second pre-sealing throttle body is placed axially above said first pre-sealing throttle body on the piston rod (10), and a second cone seat is provided in the cooling water line (9), wherein in the closed position of the regulating piston, the first pre-sealing throttle body and the second pre-sealing throttle body close respectively against the first cone seat and the second cone seat.

15. A spray cooler (1A) in accordance with claim 14, wherein the first cone seat and the second cone seat (13B, 13C) have been inserted into a guidance receptacle (13D) screwed into the cooling water line (9).

16. A spray cooler (1A) in accordance with claim 15, wherein the guidance receptacle (13D) is sealed against the housing head (2A) by means of a sealing ring (14).

17. A spray cooler (1A) in accordance with claim 16, wherein the second pre-sealing throttle body (12) on the downstream side has an expanded sealing collar (15) on the outside of the guidance receptacle which, in the closed position, additionally seals the guidance receptacle (13D) and thus the cooling water line (9) on the outlet side.

18. A spray cooler (1A) in accordance with claim 14, wherein the guidance receptacle (13D) is sealed against the housing head (2A) by means of a sealing ring (14).

19. A spray cooler (1A) in accordance with claim 14, wherein the second pre-sealing throttle body (12) on the downstream side has an expanded sealing collar (15) on the outside of the guidance receptacle which, in the closed position, additionally seals the guidance receptacle (13D) and thus the cooling water line (9) on the outlet side.

* * * * *